No. 619,211. Patented Feb. 7, 1899.
A. M. NICHOLAS.
FILTERING APPARATUS FOR SEPARATING GOLD AND SILVER BEARING SOLUTIONS.
(Application filed Nov. 14, 1898.)
(No Model.) 3 Sheets—Sheet 1.
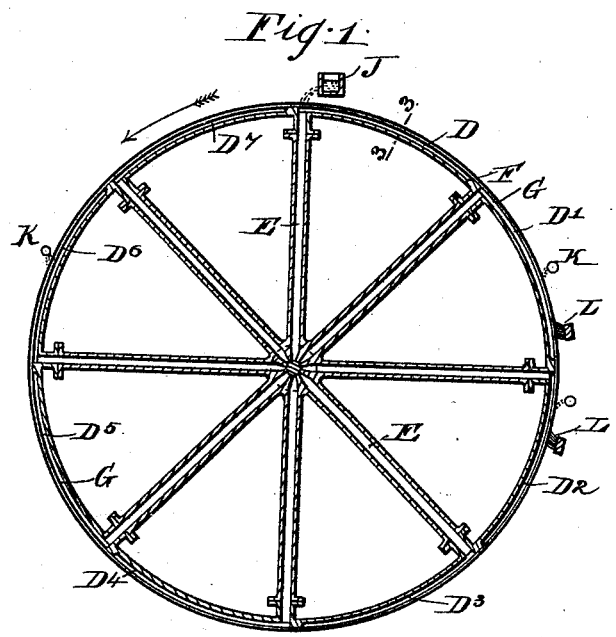
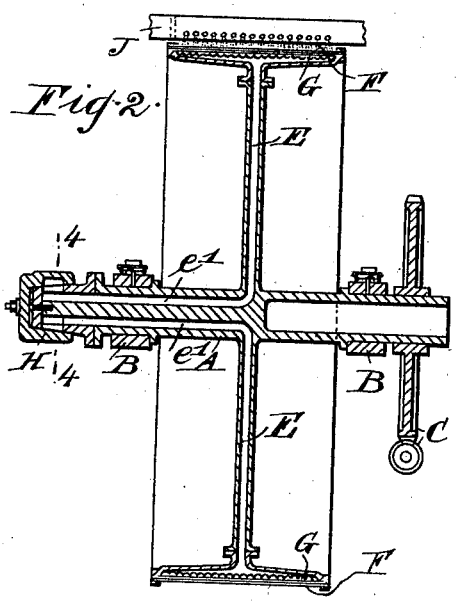
Witnesses
Inventor
Askin M. Nicholas
By James L. Norris No. 619,211. Patented Feb. 7, 1899.
A. M. NICHOLAS.
FILTERING APPARATUS FOR SEPARATING GOLD AND SILVER BEARING SOLUTIONS.
(Application filed Nov. 14, 1898.)
(No Model.) 3 Sheets—Sheet 2.
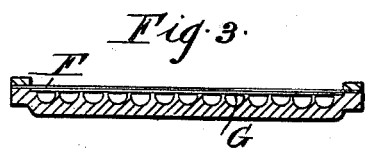
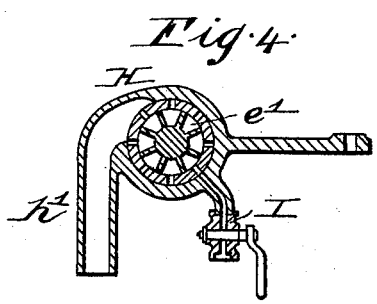
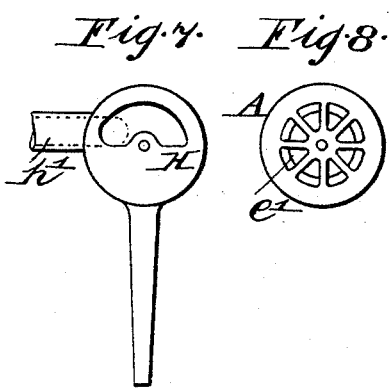

No. 619,211. Patented Feb. 7, 1899.
A. M. NICHOLAS.
FILTERING APPARATUS FOR SEPARATING GOLD AND SILVER BEARING SOLUTIONS.
(Application filed Nov. 14, 1898.)

(No Model.) 3 Sheets—Sheet 3.

UNITED STATES PATENT OFFICE.

ASKIN MORRISON NICHOLAS, OF BULONG, WESTERN AUSTRALIA.

FILTERING APPARATUS FOR SEPARATING GOLD AND SILVER BEARING SOLUTIONS.

SPECIFICATION forming part of Letters Patent No. 619,211, dated February 7, 1899.

Application filed November 14, 1898. Serial No. 696,416. (No model.)

*To all whom it may concern:*

Be it known that I, ASKIN MORRISON NICHOLAS, mining manager, a subject of the Queen of Great Britain, residing at Bulong, in the British Colony of Western Australia, have invented an Improved Rotating Filtering Apparatus Principally Applicable for the Separation of Gold and Silver Bearing Solutions from Tailings, Slimes, and the Like, of which the following is a specification.

This invention has been devised for the purpose of providing means whereby solids or insoluble material may be separated from liquids carrying same in suspension, but more particularly for the purpose of providing means whereby the separation of gold and silver bearing solutions from tailings, slimes, pug, or pulverized ore may be carried on continuously and in such a way that a clean or partially clean filter-cloth will be continuously brought into operation without necessitating stoppages for recharging, as required with the appliances at present in use.

The essential feature of the invention consists in the use of a rotating wheel, disk, or table formed with a series of air-tight compartments covered with cloth or other filtering material supported upon a metal screen or perforated plate and adapted to be automatically placed in communication with a vacuum-pump in turn for a sufficient time to enable the liquid to be drawn through the filtering material, leaving the solid constituents upon the filtering-surface, whence they can subsequently be removed by brushes, jets of water, scrapers, or similar contrivances, provision being made for automatically allowing air to enter into the various compartments at the desired period of the operation to facilitate the removal of the solids from the outer surface of the filtering material.

The invention will more readily be understood by reference to the accompanying drawings, in which—

Figure 5:
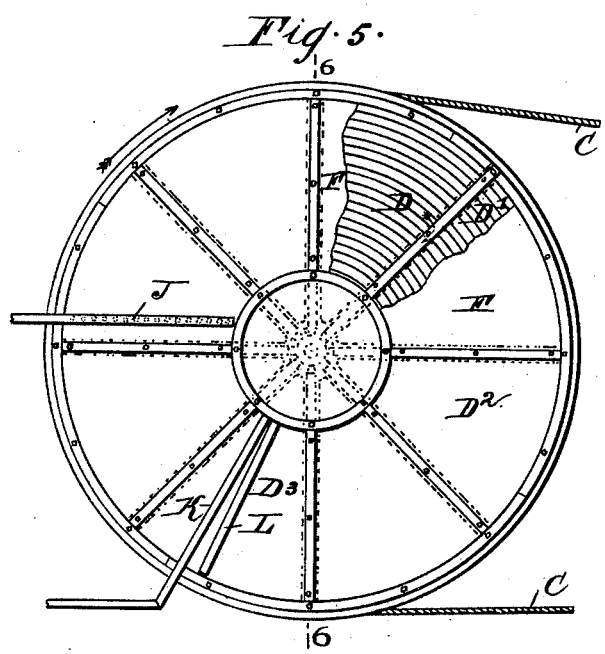
Figure 6:
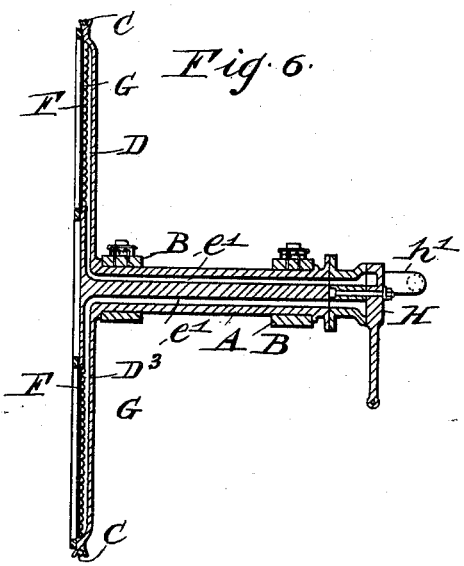

Figure 1 is a vertical central section, and Fig. 2 a vertical transverse section, of a rotating filter constructed according to this invention. Fig. 3 is a cross-section through the rim of the rotating filter on line 3 3, Fig. 1, the scale being enlarged. Fig. 4 is a transverse section on line 4 4, Fig. 2, upon an enlarged scale, illustrating the construction of a valve hereinafter described. Fig. 5 is a front elevation of a modified form of my invention. Fig. 6 is a vertical transverse section on line 6 6, Fig. 5. Fig. 7 is a front elevation, upon an enlarged scale, of the inner face of the valve used with this form of apparatus; and Fig. 8 is an end view, upon an enlarged scale, of the shaft or spindle, illustrating the arrangement of certain ports or passages therein.

The same letters of reference indicate the same or corresponding parts in all the figures.

The arrangement illustrated in Figs. 1 to 4 consists of a wheel—say twelve feet in diameter and four feet breast—mounted upon a shaft A, rotating in bearings B. This wheel may be driven at a speed of, say, from one to five feet per second at the periphery by worm and worm-wheel gear C or otherwise. The wheel is made with a number of compartments on its periphery, (marked D to $D^7$,) each communicating with one of the hollow spokes E and covered with filter-cloth F or other material resting upon a screen G, of wirework or perforated sheet metal. Each of the hollow spokes E is in communication through ports or passages $e'$ in the axle A with a stationary valve H, communicating through a suction-pipe $h'$, with a suction-pump. This valve H is constructed and arranged, as illustrated in Fig. 4, so as to place only two of said hollow spokes E in communication with said suction-pump at the same time. Said valve is provided with a small air-admission cock I, whereby air may be admitted to each hollow spoke in turn as it passes said valve. This enables the solid material to be more easily removed.

J represents a distributing-launder for feeding the slimes, tailings, or other material onto the filter, while K K represent perforated water-supply pipes whereby jets of water may be delivered onto the filtering medium in order to remove the solid particles therefrom. L L represent brushes which can also be used for this purpose.

In using the above-described apparatus the material to be filtered or from which the liquid is to be extracted is fed by the launder J onto the upper part of the wheel—say, for instance, onto the compartment D. As the wheel continues to rotate in the direction of the arrows shown in Fig. 1 this compartment will be placed in communication through its spoke E, port or passage $e'$, and the valve H with the suction-pump, whereby the gold and silver bearing solution or other liquid will be drawn through the filter and delivered into storage-tanks or elsewhere, leaving the solid constituents on its surface. This operation will be continued until the material has been carried around through about one-fourth of a revolution of the wheel, when the valve H will shut off the compartment from the vacuum-pump, and the solid material can then be removed by washing or brushing it off the surface. This operation can be assisted by the admission of air through the valve I, and if adhesive material, such as clay, has to be treated air under pressure can be forced into the compartment through said valve, as will be readily understood.

Where necessary, water may be added to the partially-dried slimes or other material while on the surface of the filter and be drawn through into the vacuum-chambers in the wheel, so as to still further impoverish the residues.

The invention is also applicable for the recovery and reuse of water from ordinary battery-tailings. In such a case there is no necessity to use water-jets to remove the sand from the filter, as it does not adhere closely thereto and can be removed by brushes alone.

In the arrangement above described the sludge is shown as distributed upon the top of the wheel; but it is obvious that the slimes or other material can be brought into contact therewith at any desired part. For instance, the arrangement illustrated in Figs. 5 and 6 may be used, the various vacuum-compartments being formed in sections upon the face of the disk or table instead of on the periphery and the slimes being fed onto it through jets J, as indicated in said figures. In this arrangement the wheel is shown as being driven by an endless rope C instead of the worm and worm-wheel gear above described; but it is obvious that any convenient form of driving-gear may be employed.

In operation the flow of pulp onto the rotating filter is continuous from the vessel in which it is stored. The speed of the filter and the rate of supply thereto are regulated so as to keep the film of solid material just sufficiently thick as not to resist the external atmospheric pressure.

Having now particularly described and ascertained the nature of my said invention and in what manner the same is to be performed, I declare that what I claim is—

1. In a filtering apparatus, the combination with a rotating wheel having a series of peripheral compartments covered with filtering material upon their outer, or circumferential faces, each compartment communicating by a hollow spoke with a separate passage in the axle or shaft, an exhaust-pipe with which a part only of the latter passages have communication at the same time, and means for feeding the material to be filtered upon the upper portion of the revolving wheel, substantially as described.

2. In a filtering apparatus, the combination with a revolving wheel having peripheral closed compartments and provided with a circumferential covering of filtering material, of an exhaust-pipe having one end open to a portion of the wheel-shaft and successively communicating with separate longitudinal passages in said shaft as the wheel revolves, a series of hollow spokes leading from said shaft-passages to the peripheral compartments, means for feeding the substance to be filtered upon the filtering material on the upper side of the wheel as the latter revolves, and water-supply pipes to spray water upon said substance, substantially as described.

3. In a filtering apparatus, the combination with a revolving wheel having separate closed compartments on its periphery and provided with a circumferential covering of filtering material, of a shaft having a number of separate longitudinal passages, a series of tubular spokes placing said passages in communication with the peripheral compartments, an exhaust-pipe having one end brought into communication with a plurality of the passages in said shaft as the wheel revolves, means for feeding the substance to be filtered upon the upper side of the wheel and upon the filtering material as the wheel revolves, pipes to spray water thereon, and brushes to remove the residue of said substance after the separation is effected, substantially as described.

ASKIN MORRISON NICHOLAS.

Witnesses:
CHARLES CLARK,
HARRY HALE.